Sept. 15, 1964 M. R. AARON ET AL 3,149,323

THREE-LEVEL BINARY CODE TRANSMISSION

Original Filed Nov. 23, 1959 2 Sheets-Sheet 1

INVENTORS M. R. AARON
J. S. MAYO

BY R. B. Ardis

ATTORNEY

THREE-LEVEL BINARY CODE TRANSMISSION

Original Filed Nov. 23, 1959 2 Sheets-Sheet 2

INVENTORS M. R. AARON
J. S. MAYO
BY R. B. Anderson
ATTORNEY

United States Patent Office 3,149,323
Patented Sept. 15, 1964

3,149,323

THREE-LEVEL BINARY CODE TRANSMISSION

Marvin R. Aaron, Whippany, and John S. Mayo, Berkeley Heights, N.J., assignors to Bell Telephone Laboratories, Incorporated, New York, N.Y., a corporation of New York Continuation of application Ser. No. 854,666, Nov. 23, 1959. This application July 25, 1962, Ser. No. 215,238
8 Claims. (Cl. 340—347)

This invention relates generally to the transmission of information by pulse techniques and more particularly, although in its broader aspects not exclusively, to transmission by pulse code techniques based upon a two-level or binary code.

This application is a continuation of the present inventors' prior application Serial No. 854,666, which was filed November 23, 1959, and has since been abandoned.

In the past, one difficulty with transmission of a conventional binary code train in a pulse code modulation or PCM system has been that such a pulse train possesses a direct-current component which creates restoration problems in systems employing transformers and coupling capacitors. Several schemes have been devised for converting an ordinary unipolar binary code train into a bipolar pseudo-ternary code train having no component at zero frequency. One of these is disclosed in United States Patent 2,759,047, which issued August 14, 1956, to L. A. Meacham. Another is disclosed in United States Patent 2,996,578, which issued August 15, 1961, to F. T. Andrews, Jr. In both, oppositely poled pulses appear alternately to provide a null in the power density spectrum of the pulse train at zero frequency. Problems of direct-current restoration are thus substantially eliminated.

Both bipolar pulse conversion schemes provide the pulse train with a power density spectrum having a peak at approximately half the basic pulse repetition frequency or bit rate. Under most circumstances, such a peak is not disadvantageous. There are, however, occasions when it is likely to be the source of troublesome crosstalk. One such occasion may occur when such bipolar pulse conversion schemes as those disclosed by Meacham and Andrews are used on adjacent lines in a single telephone cable. Another may occur when such a scheme is used on a line adjacent to another line in the same cable carrying waves having important components at that frequency. In both instances, the crosstalk difficulty can be avoided by returning to conventional unipolar binary code transmission on one of the lines, but the advantages of conversion are then, of course, lost on that line.

A principal object of the present invention, therefore, is to reduce crosstalk between adjacent lines in a three-level pseudo-ternary pulse transmission system.

Another and more particular object is to convert a conventional unipolar binary code pulse train into a three-level train without introducing a peak in the power density spectrum of the pulse train in the vicinity of half the bit rate.

Still another object is to permit greater versatility than that afforded by the prior art in shaping the power density spectrum of a binary code pulse train.

The present invention permits both realization of these objects and retention of the advantages of the prior art represented by the disclosures of the above-identified Meacham and Andrews patents. In accordance with the present invention, a conventional binary code train of marks or ON pulses and spaces or OFF pulses is converted into a pseudo-ternary train by inverting the polarity of alternate groups of $n$ consecutive ON pulses, where $n$ is an integer greater than unity. The resulting pulse train is a pseudo-ternary or three-level train having separate peaks in its power density spectrum at frequencies both above and below half the bit rate but having only a relatively small component at or near the one-half bit rate point. The null afforded at zero frequency by the prior art is retained. The original binary code train is recovered from the pseudo-ternary train by simple full-wave rectification.

Since the present invention retains the null at zero frequency afforded by Meacham and Andrews, problems of direct-current restoration are avoided. The present invention provides a power density spectrum with a relatively low, flat portion in the vicinity of half the bit rate, however, and avoids troublesome interference with neighboring lines carrying waves having important components at that frequency.

A more complete understanding of the invention may be obtained from a study of the following detailed description of several specific embodiments. In the drawings.

Figure 1:
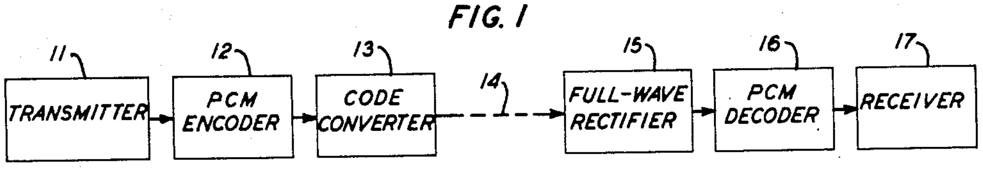
FIG. 1 is a block diagram showing the general outline of a PCM system employing the invention.

A PCM system in which the present invention finds ready application is shown in block diagram form in FIG. 1. There, a transmitter 11 supplies signal amplitude samples containing the intelligence to be transmitted to a PCM encoder 12. Encoder 12 converts the signal amplitude samples to unipolar code groups of ON and OFF pulses in conventional two-level binary code form and supplies them to a code converter 13. Code converter 13, which may take the form of the circuits illustrated in FIGS. 2 and 5, alters the power density spectrum of the pulse train by producing a pseudo-ternary or three-level code train for transmission over transmission medium 14. This three-level pulse train is received by a suitable code restorer 15 which, in accordance with an important feature of the invention, is simply a full-wave rectifier. Rectifier 15 restores the pulse train to its original unipolar binary code form and supplies it to a PCM decoder 16. Decoder 16 converts each code group to an equivalent signal amplitude sample which is, in turn, transmitted to a receiver 17 for utilization.

Figure 2:
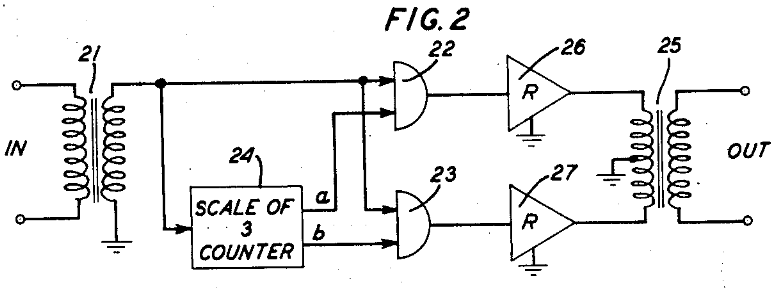
FIG. 2 illustrates a code converter embodying the present invention in which $n$ is equal to 2.

The code converter illustrated in FIG. 2 makes use of the principles of the invention by selecting successive groups of two consecutive marks or ON pulses and inverting the polarity of both of the ON pulses of alternate ones of the selected groups. A mark or ON pulse, in this contact, represents the presence of a pulse, while a space or OFF pulse represents the absence of a pulse. Conventional unipolar binary code groups of marks or ON pulses and spaces or OFF pulses are received from the system encoder on an input transformer 21. Transformer 21, in turn, supplies the unipolar code groups to each of a pair of AND gates 22 and 23 and to a scale-of-three counter 24. Each AND gate has a pair of input leads and energizes its single output lead only when both input leads are energized simultaneously. Each AND gate is represented in the drawings by a semicircle in which the input leads extend only to the chord. Scale-of-three counter 24 differs from an ordinary scale-of-two or binary counter in that it generates one output pulse for every three input pulses instead of one for every two. It requires a sequence of two ON pulses instead of a single ON pulse, in other words, to change state. Scale-of-three counter 24 has two output terminals, labeled *a* and *b*, respectively, that are opposite to one another in state at all times and are connected to AND gates 22 and 23.

Scale-of-three counter 24 and AND gates 22 and 23 serve to route each successive pair of ON pulses received from transformer 21 to an alternate one of the two conversion channels controlled by AND gates 22 and 23. The two channels are combined in phase opposition to one another with the aid of an output transformer 25. A regenerative pulse amplifier 26 is connected between the output lead of AND gate 22 and one end of the primary winding of transformer 25 to provide sharply defined pulses of standard amplitude. A regenerative pulse amplifier 27 is similarly connected between the output lead of AND gate 23 and the other end of the winding. The midpoint of the primary winding of output transformer 25 is grounded to provide the necessary circuit balance.

Figure 3:
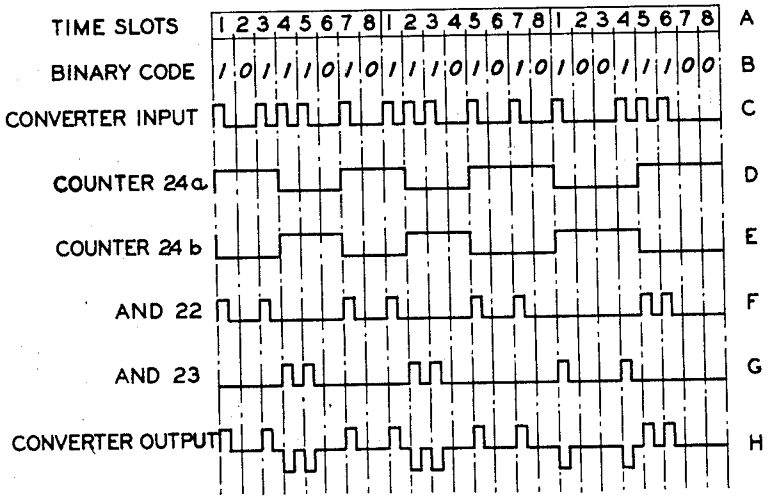
FIG. 3 shows a series of waveforms appearing at various points in the converter of FIG. 3 for different input signals.

The operation of the embodiment of the invention shown in FIG. 2 is illustrated by the waveforms shown in FIG. 3. There, line A indicates the successive time slots for three consecutive code groups and line B gives the conventional binary number representation of three eight-digit code groups used as examples. The waveform of the succession or corresponding unipolar code groups received by input transformer 21 is shown in line C. A fifty percent duty cycle is shown by way of example. The action of scale-of-three counter 24 is shown in lines D and E. As illustrated in lines F and G, the two conversion channels controlled by AND gates 22 and 23 carry successive groups of two ON pulses in alternation. These two conversion channels are, in accordance with the invention, combined in phase opposition to each other, with all ON and OFF pulses retaining their original order, resulting in the final three-level pseudo-ternary pulse train illustrated in line H. As shown, each successive pair of ON pulses in this train are of opposite polarity.

Figure 4:
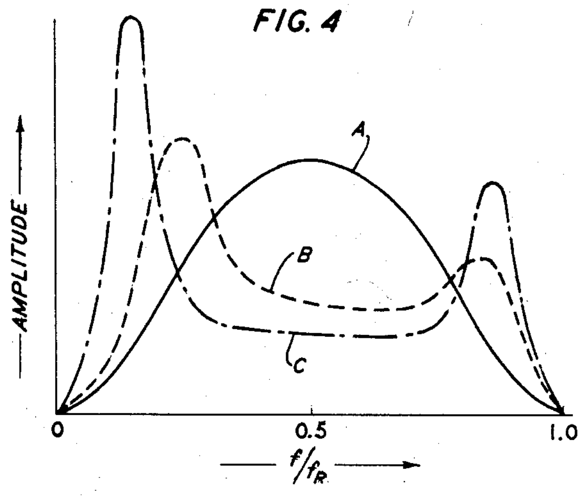
FIG. 4 illustrates the power density spectra afforded by embodiments of the present invention in contrast with one provided by the prior art.

The power density spectrum of the three-level pulse train provided by the embodiment of the invention shown in FIG. 2 is illustrated as curve B in FIG. 4. Curve A in that same figure shows the power density spectrum produced by the prior art three-level code conversion schemes disclosed by Meacham and Andrews. As shown, the latter has a null at zero frequency and a broad peak in the vicinity of the bit rate, $f_R$. Such a spectrum avoids problems of direct-current restoration but may interfere unduly with adjacent lines carrying waves having important components in the same frequency range. The spectrum provided by the embodiment of the invention illustrated in FIG. 2, however, not only retains the null at zero frequency but also splits the peak into two portions well removed from the half bit-rate region. As shown, the portion of the spectrum in the vicinity of half the bit rate is of relatively low amplitude and is likely to cause little interference on adjacent lines.

In general, the invention contemplates routing successive groups of *n* consecutive ON pulses into the two conversion channels in alternation, where *n* is an integer greater than unity. The greater the value of *n*, the greater is the separation between the two peaks in the power density spectrum of the resulting three-level pulse train and the lower is the amplitude of the components in the region of half the bit rate. The scale of the counter used is, in each instance, equal to the quantity $(n+1)$. From one point of view, there is no limit to the advantage to be gained by using higher and higher values of *n*. As a practical matter, however, higher values of *n* require more complex counter circuits and move the low-frequency peak in the power density spectrum nearer and nearer to the zero frequency mark. If this peak moves too close to that mark, it is likely to require inordinately large system coupling transformers in order to provide the necessary low-frequency response. For these reasons, limitation to a relatively small value of *n* is generally desirable.

Figure 5:
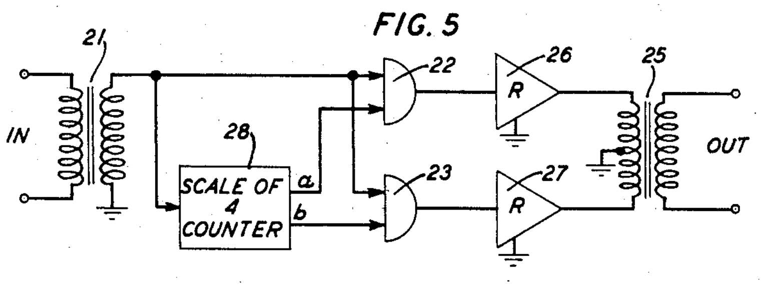
FIG. 5 shows a code converter embodying the invention in which $n$ is equal to 3.

The embodiment of the invention illustrated in FIG. 5 is generally similar to the one illustrated in FIG. 2 but uses a scale-of-four counter 28 in place of scale-of-three counter 24. The value of *n* is thus 3. Scale-of-four counter 28 generates one output pulse for every four input pulses. It requires a sequence of three ON pulses, in other words, to change state. Like scale-of-three counter 24 in FIG. 2, scale-of-four counter 28 has two output terminals, labeled *a* and *b*, respectively, that are opposite to one another in state at all times and are connected to AND gates 22 and 23.

Figure 6:
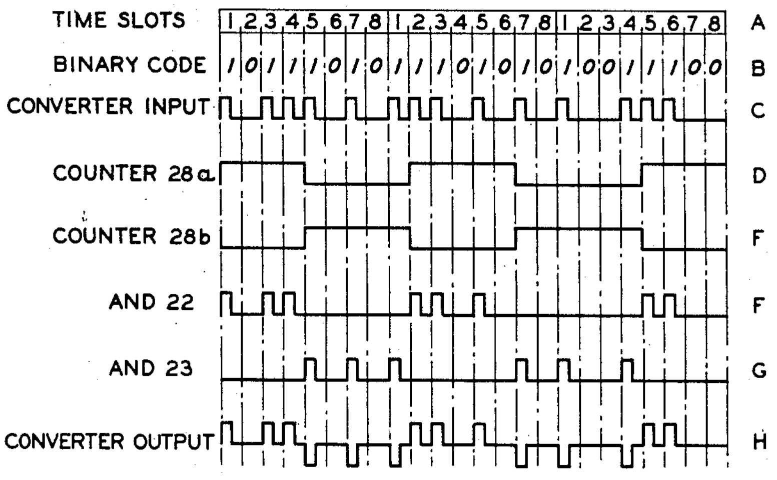
FIG. 6 shows a series of waveforms appearing at various points in the converter of FIG. 5 for different input signals.

The operation of the code converter shown in FIG. 5 is illustrated by the waveforms of FIG. 6. As in FIG. 3, line A indicates the successive time slots for three consecutive code groups and line B gives the conventional binary number representation of three eight-digit code groups used as examples. The waveform of the unipolar two-level code groups themselves is illustrated in line C. Lines D and E show the action of scale-of-four counter 28, while lines F and G show the successive groups of three ON pulses carried by the conversion channels controlled by AND gates 22 and 23. The final three-level train is shown in line H. As illustrated, three ON pulses of each polarity follow in sequence before they are succeeded by ON pulses of the opposite polarity.

The power density spectrum for the three-level train provided by the embodiment of the invention shown in FIG. 5 is illustrated as curve C in FIG. 4. As shown, it retains a null at zero frequency and moves the two peaks even farther away from the half bit-rate frequency. The lower of these two peaks is still far enough removed from direct current, however, to avoid imposing unduly severe requirements upon the coupling transformers in the system.

From one point of view, a principal advantage of the invention is the increased versatility it gives the system designer in permitting him to shape the power density spectrum of a pulse train as he sees fit. Nulls can be created at zero frequency to avoid problems of direct-current restoration and peaks can be shifted about with precision in order to avoid interference with other systems having similar power density spectra on adjacent lines.

It is to be understood that the above-described arrangements are illustrative of the application of the principles of the invention. Numerous other arrangements may be devised by those skilled in the art without departing from the spirit and scope of the invention. Pulse shapes other than fifty percent duty cycle rectangular pulses may be used, for example, to yield power density spectra with shapes differing from those shown in FIG. 4.

What is claimed is:

1. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-lavued pulse train having a power density spectrum with no discrete components and with a continuous component which has nulls at zero frequency and said basic pulse repetition frequency and its first peak at less than half said basic pulse repetition frequency which comprises means for selecting successive groups of *n* consecutive ON pulses from said two-valued binary code train, where *n* is an integer greater than unity, and means for inverting with respect to the OFF pulses the polarity of all of the ON pulses of alternate ones of said selected groups while leaving the OFF pulses substantially undisturbed.

2. Apparatus in accordance with claim 1 in which $n$ is equal to two.

3. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-valved pulse train having a power density spectrum with no discrete components and with a continuous component which has nulls at zero frequency and said basic pulse repetition frequency and its first peak at less than half said basic pulse repetition frequency which comprises a pair of conversion channels, means for routing successive groups of $n$ consecutive ON pulses from said two-valued binary code train into alternate ones of said conversion channels in sequence, where $n$ is an integer greater than unity, means for inverting with respect to the OFF pulses the polarity of all of the ON pulses in one of said conversion channels while leaving the OFF pulses substantially undisturbed, and means for combining pulses from both of said conversion channels in their original sequence.

4. Apparatus in accordance with claim 3 in which $n$ is equal to two.

5. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different energy levels and all of said ON pulses have the same polarity with respect to said OFF pulses, into a three-valued pulse train having a power density spectrum with no discrete components and with a continuous component which has nulls at zero frequency and said basic pulse repetition frequency and its first peak at less than half said basic pulse repetition frequency which comprises a pair of conversion channels, means for routing successive groups of $n$ consecutive ON pulses from said two-valued binary code train into alternate ones of said conversion channels in sequence to form a pair of sub-trains, where $n$ is an integer greater than unity, and means for combining said sub-trains in phase opposition to each other, whereby all of the ON pulses in one of said sub-trains are inverted in polarity with respect to the OFF pulses and all of the OFF pulses in both of said sub-trains and all of the ON pulses in the other of said sub-trains are left substantially undisturbed.

6. Apparatus in accordance with claim 5 in which $n$ is equal to two.

7. Apparatus for converting a two-valued binary code train of ON and OFF pulses having a basic pulse repetition frequency and a power density spectrum with discrete components at zero frequency and at said basic pulse repetition frequency and with a substantial continuous component at both zero frequency and said basic pulse repetition frequency, where said ON and OFF pulses are respectively different voltage levels and all of said ON pulses have the same polarity with respect to said OFF pulses, into a three-valued pulse train having a power density spectrum with no discrete components and with a continuous component which has nulls at zero frequency and said basic pulse repetition frequency and its first peak at less than half said basic pulse repetition frequency which comprises a scale of $m$ counter having a pair of outputs, where $m$ is an integer greater than two, said counter generating an OFF pulse at each of its outputs whenever it generates an ON pulse at the other of its outputs, a pair of AND gates each having a single output, means to apply said two-valued binary code train to said counter, means to apply both said two-valued binary code train and one of the outputs of said counter to one of said AND gates, means to apply both said two-valued binary code train and the other of the outputs of said counter to the other of said AND gates, an output transformer having a center-tapped primary winding, the center tap of said primary winding being connected to the voltage level of said OFF pulses, and means connecting the outputs of said AND gates to respectively opposite ends of said primary winding.

8. Apparatus in accordance with claim 7 in which said counter is a scale of three counter.

References Cited in the file of this patent

UNITED STATES PATENTS 2,700,696 Barker ---------------- Jan. 25, 1955